United States Patent [19]
Yamamoto

[11] Patent Number: 5,881,151
[45] Date of Patent: Mar. 9, 1999

[54] SYSTEM FOR CREATING VIRUS DIAGNOSING MECHANISM, METHOD OF CREATING THE SAME, VIRUS DIAGNOSING APPARATUS AND METHOD THEREFOR

[75] Inventor: Takashi Yamamoto, Kawasaki, Japan

[73] Assignee: Fujitsu Limited, Kawasaki, Japan

[21] Appl. No.: 278,051

[22] Filed: Jul. 20, 1994

[30] Foreign Application Priority Data

Nov. 22, 1993 [JP] Japan ..................................... 5-291658

[51] Int. Cl.⁶ ....................................................... G06F 9/00
[52] U.S. Cl. ................................................ 380/4; 395/705
[58] Field of Search .......................... 380/4, 25; 364/550; 395/700, 706, 707, 708

[56] References Cited

U.S. PATENT DOCUMENTS

| 5,050,212 | 9/1991 | Dyson | 380/25 |
| 5,121,345 | 6/1992 | Lentz | 364/550 |
| 5,359,659 | 10/1994 | Rosenthal | 380/4 |

FOREIGN PATENT DOCUMENTS

| 62-126438 | 6/1987 | Japan . |
| 2-17536 | 1/1990 | Japan . |
| 2-76001 | 3/1990 | Japan . |
| 2-96834 | 4/1990 | Japan . |
| 2-179218 | 7/1990 | Japan . |

OTHER PUBLICATIONS

A Generic Virus Scanner for C++–Sandeep Kumar, and Eugene H. Spafford, IEEE proceeding.

Measuring and Modeling Computer Virus Prevalence. Jeffrey O. Kephart and Steve R. White, 1993 IEEE M.B. Symposium.

*Primary Examiner*—Majid A. Banankhah
*Attorney, Agent, or Firm*—Staas & Halsey

[57] ABSTRACT

When a source program is, by a compiler, translated to an object program that can be executed by a computer, a diagnostic object generating portion provided as one function of the compiler generates a virus diagnosing portion in the object program. The virus diagnosing portion performs a verification of the program size, verification of a checksum, verification of revision information such as date of creation, verification of the disk address, verification of the object program and the verification of the object program using compression and decompression.

37 Claims, 14 Drawing Sheets

SYSTEM FOR CREATING VIRUS DIAGNOSING MECHANISM, METHOD OF CREATING THE SAME, VIRUS DIAGNOSING APPARATUS AND METHOD THEREFOR

BACKGROUND OF THE INVENTION

The present invention relates to a system for creating a virus diagnosing mechanism, a method of creating the same, a virus diagnosing apparatus and a method therefor arranged for the purpose of preventing computer virus infection, and more particularly to a system for creating a virus diagnosing mechanism acting as an antibody against an invading virus, a method of creating the same, a virus diagnosing apparatus and a method therefor.

In computer systems developed in recent years, generations of computer viruses raise a necessity of a function which is capable of preventing virus infection. Hitherto, if an abnormal phenomenon, such as breakage of a file, has taken place due to infection of an outside computer virus computer vaccines capable of the function of making the computer virus ineffective have been developed for the purpose of preventing the virus infection.

However, the conventional prevention against the virus infection by using the computer vaccine involves a long time to develop a vaccine effective to a virus of a new type. Therefore, there arises a risk of infection with the virus during the time required for the development. In addition, even if infection with a virus has taken place, damage of a degree that one file disappears cannot be found out and thus there arises a problem that the damage of the file breakage spreads critically until the virus infection is detected.

SUMMARY OF THE INVENTION

According to the present invention, there are provided a method and an apparatus for creating a virus diagnosing mechanism, a virus diagnosing apparatus and a method therefor capable of automatically creating a virus diagnosing mechanism in a stage of translation to the object program by a compiler and enabling the object program, which is executed as an OS (Operating System) or a program, to diagnose virus infection.

The system for creating the virus diagnosing mechanism according to the present invention comprises a compiling portion and a diagnostic object generating portion disposed in the compiling portion. The compiling portion translates a source program to an object program that can be executed by an arbitrary computer. The diagnostic object generating portion is provided as one of functions of the compiling portion so as to generate a virus diagnosing portion in the object program.

The virus diagnosing portion to be generated by the diagnostic object generating portion is able to realize any one of the following functions:

[Verification of Program Size]

The original size of the object program translated by the compiling portion is stored. The execution size of the object program loaded and executed as an operating system or a program for a computer is detected so as to be subjected to a comparison with the original size. If they coincide with each other, the process is continued. If they do not coincide with each other, a discrimination is made that virus infection has taken place and the process is interrupted.

[Verification of Checksum]

The checksum of the original object program translated by the compiling portion is stored. The checksum of the object program loaded and executed as an operating system or a program for the computer is detected so as to be subjected to a comparison with the original checksum. If they coincide with each other, the process is continued. If they do not coincide with each other, a discrimination is made that virus infection has taken place and the process is interrupted.

[Verification of Revision Information]

Revision information of the original object program translated by the compiling portion is stored. Revision information of the object program loaded and executed as an operating system or a program for the computer is detected so as to be subjected to a comparison with the original revision information. If they coincide with each other, the process is continued. If they do not coincide with each other, a discrimination is made that virus infection has taken place and the process is interrupted. As the revision information, at least any one of date of creation including updating, time of creation including updating, name of the creator, program name and the version number is used.

[Verification of Disk Address]

The disk address indicating the place, in which the object program translated by the compiling portion is stored, is stored. The disk address of the object program loaded and executed as an operating system or a program for the computer is detected so as to be subjected to a comparison with the original disk address. If they coincide with each other, the process is continued. If they do not coincide with each other, a discrimination is made that virus infection has taken place and the process is interrupted.

[Verification of Object Program]

The object program translated by the compiling portion is as it is stored as the original. The object program loaded and executed as an operating system or a program for the computer is read so as to be subjected to a comparison with the original object program. If they coincide with each other, the process is continued. If they do not coincide with each other, a discrimination is made that virus infection has taken place and the process is interrupted.

[Verification of Object Program by Using Compression and Decompression]

The original object program translated by the compiling portion is compressed and stored. The object program loaded and executed as an operating system or a program for the computer is read. Simultaneously the compressed object program is restored by decompressing. The decompressed object and the execution object are subjected to a comparison with each other. If they coincide with each other, the process is continued. If they do not coincide with each other, a discrimination is made that virus infection has taken place and the process is interrupted. An updating inhibition portion for inhibiting rewriting of the program due to the execution of the object program may be additionally provided for the compiling stage.

Furthermore, the present invention uses, as the subject, the virus diagnosing mechanism generated in the diagnostic object generating portion, that is, the virus diagnostic object.

According to the present invention, the virus diagnosing mechanism serving as information that cannot be detected only when the object is generated is created and embedded in the object when the compiler is used in the object creation performed such that the source program is translated to the object program. Therefore, if the object has been rewritten by a virus during execution as an operating system or a program for the computer, the virus diagnosing mechanism of the object enables the object to recognize rewriting. As a result, if a discrimination has been made that the object has been infected with the virus, the execution is interrupted so that damage of the virus is minimized.

The above and other objects, features, and advantages of the present invention will become more apparent from the following detailed description with reference to the drawings.

DETAILED DESCRIPTION OF THE PREFERRED EMBODIMENT

Figure 1:
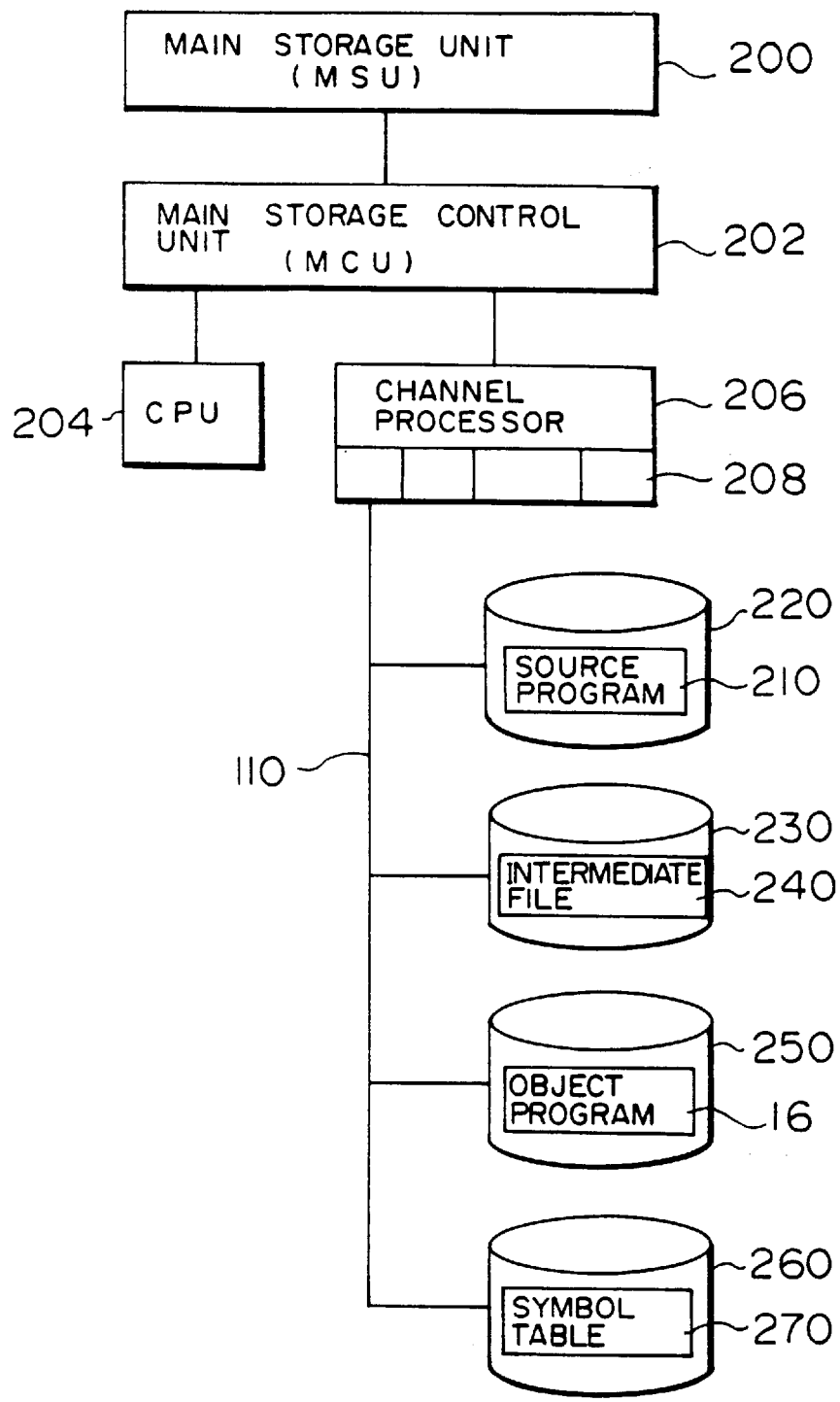
FIG. 1 is a block diagram of a compiler for use in the present invention.

FIG. 1 shows a compiler machine for use to create an object program having a virus diagnosing mechanism according to the present invention, the virus diagnosing mechanism being embedded in the object program. A main storage unit 200 stores an operating system (OS) so that a program for realizing a compiler is developed when electric power is supplied. A main storage control unit 202 is disposed to correspond to the main storage unit 200. The main storage control unit 202 is provided with a CPU 204 and a channel processor 208. In accordance with the translated compiler program in the main storage unit 200, the CPU 204 performs compilation for translating a source program into an object program expressed in an assembler language or a machine language that can be executed by a computer. File units 220, 230, 250 and 260 each comprising a magnetic disk unit or the like are connected to the channel unit 208 of the channel processor 206 through a channel bus 210. The file unit 220 stores a source program 10 for performing the compilation. The file unit 230 stores an intermediate file 240 generated in each compilation process. The file unit 250 stores a compiled object program 16 having the virus diagnosing mechanism. The file unit 260 stores a symbol table 270 generated in the compilation process. Other input units and output units, such as a CRT, a printer, a keyboard and the like (omitted from illustration), are, of course, connected to other channel units of the channel processor 206.

Figure 2:
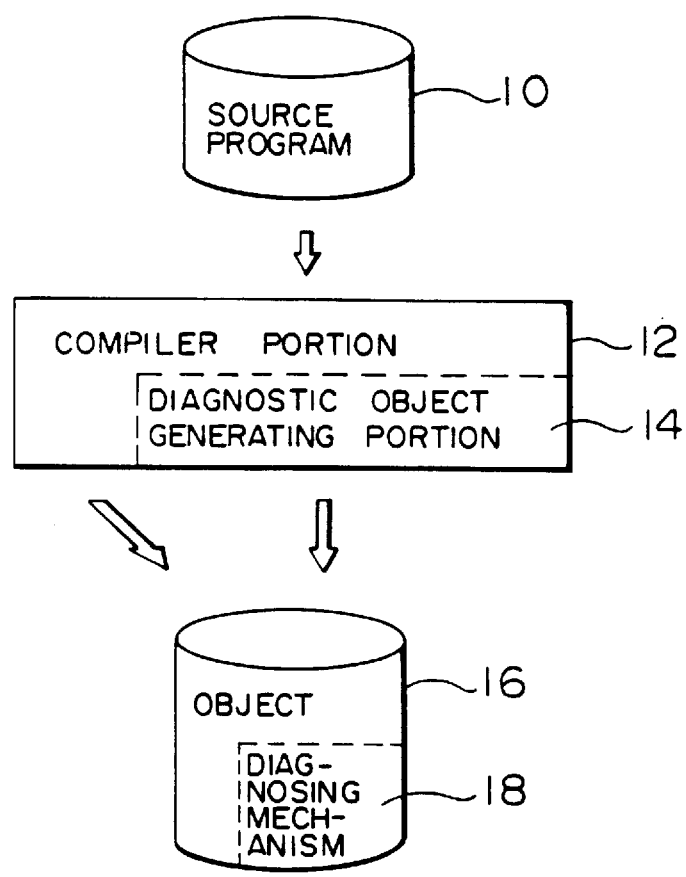
FIG. 2 shows the procedure of creating a virus diagnosing mechanism according to the present invention.

FIG. 2 schematically shows a procedure of creating the object program having the virus diagnosing mechanism according to the present invention. The source program 10 is created by using an adequate program language, such as COBOL, FORTRAN or the like, so as to be applied as file information in the file units. A compiling portion 12 receives the source program 10 to translate it into the object program expressed in an assembler language or a machine language that can be executed by a subject computer, the compiling portion 12 being arranged to output the object program 16 as file information. In the present invention, a diagnostic object generating portion 14 is newly provided in the compiling portion 12. The diagnostic object generating portion 14 automatically creates a virus diagnosing mechanism 18 in the object program 16 when the source program 10 is translated to the object program 16 by the compiling portion 12. The function of the diagnostic object generating portion 14 for creating the virus diagnosing mechanism 18 does not depend on the source program 10 so that the virus diagnosing mechanism 18 is, regardless of the content of the source program 10, automatically embedded in the object program 16 by passing the source program 10 through the compiling portion 12. Therefore, the necessity of having a consciousness of the virus diagnosing mechanism 18 according to the present invention can be eliminated during the process of creating the source program 10.

Figure 3:
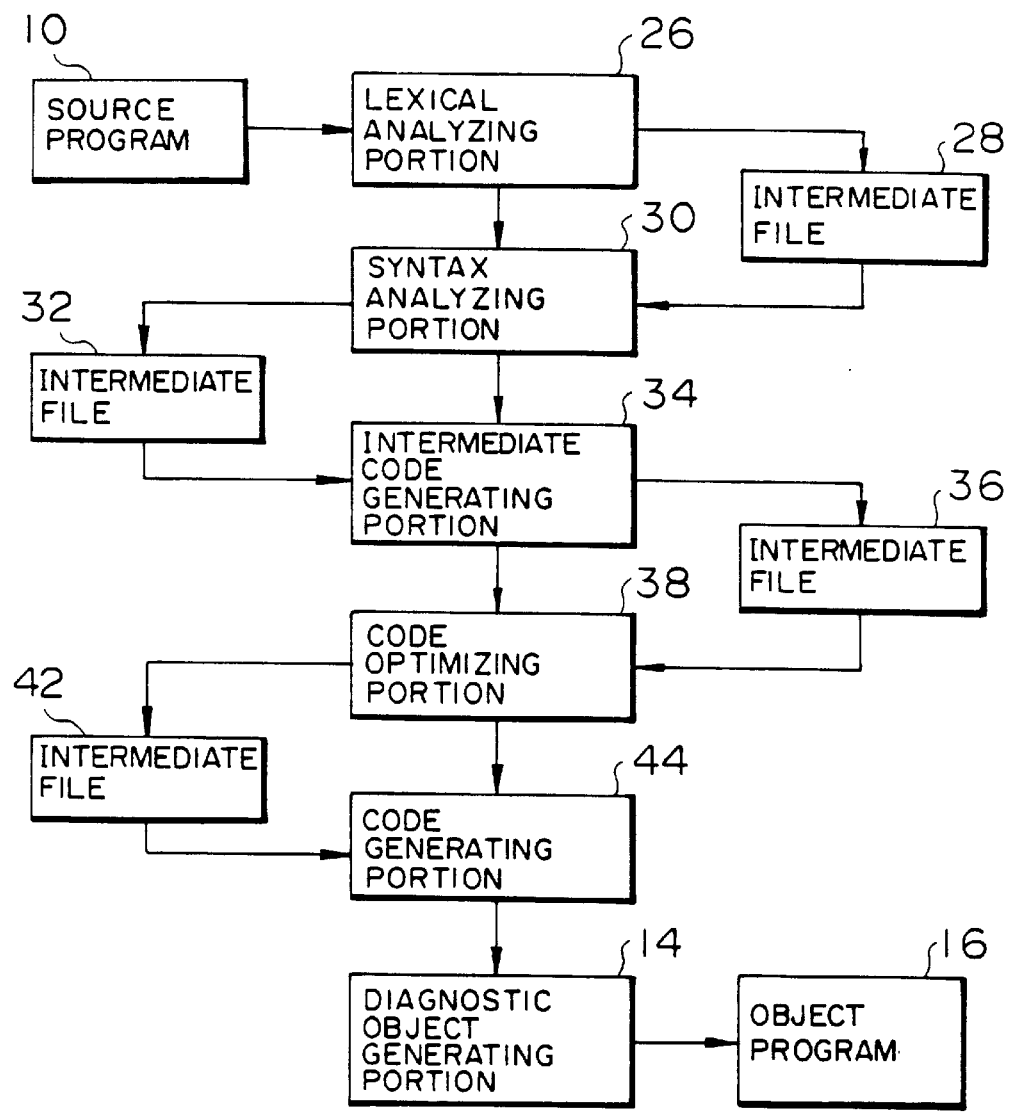
FIG. 3 is a block diagram of the functions of the compiler.

FIG. 3 shows the structure and functions of the compiling portion 12 having the diagnostic object generating portion 14 shown in FIG. 2. The functions of the compiler is realized when the CPU 204 shown in FIG. 1 executes the program. The compiler consists of a lexical analyzing portion 26, a syntax analyzing portion 30, an intermediate code generating portion 34, a code optimizing portion 38, a code generating portion 44 and the diagnostic object generating portion 14. The lexical analyzing portion 26 receives the source program 10. The lexical analyzing portion 26, the syntax analyzing portion 30, the intermediate code generating portion 34 and the code optimizing portion 38 respectively create intermediate files 28, 32, 36 and 42. The lexical analyzing portion 26 receives the source program 10 written in a predetermined programming language such as COBOL or FORTRAN to analyze the vocabulary of the program language. That is, the lexical analyzing portion 26 sections the source program 10 written in the programming language into units each called a "token" to check the validity of the word. The lexical analyzing portion 26 checks the validity of all vocabulary words of the source program 10, and then it outputs the intermediate file 28 formed by collecting the tokens so as to send the intermediate file 28 to the syntax analyzing portion 30.

The syntax analyzing portion 30 receives the intermediate file 28 created in the lexical analyzing portion 26 to check whether or not the source program 10 meets the grammatical rule of the employed programming language. If the source program 10 meets the grammatical rule, the syntax analyzing portion 30 determines the procedure of executing the source program 10 and transmits it as the intermediate file 32. The syntax analysis performed by the syntax analyzing portion 30 generally has two functions. One of the two functions is to check whether or not each token on the source program 10 is present at a grammatically correct position. A second function is to analyze the existential meanings of all tokens on the source program 10, to determine the procedure for executing all tokens and to express the procedure as the flow of the tokens or in the form of a group. In general, the results of the analysis of the procedure of executing each token is expressed by a parser tree.

The intermediate code generating portion 34 receives the parser tree of the intermediate file 32 created by the syntax analyzing portion 30 to translate it to a peculiar intermediate code of the compiler so as to output the intermediate file 36. As a typical intermediate code, a 3-operand method has been known. The code optimizing portion 38 receives the intermediate code of the intermediate file 36 obtained in the intermediate code generating portion 34 to translate it into an intermediate language that can be executed on the target computer with a minimum capacity and at the fastest speed, the code optimizing portion 38 then transmitting the intermediate file 42. As a general optimizing method, a local optimization and a loop optimization are exemplified. The local optimization is a method of decreasing excess commands, while the loop optimization is a method of unconditionally expelling, from the loop, an expression that shows the same value whenever the loop is executed, if any, so as to execute only the first loop. The code generating portion 44 receives the intermediate code or the intermediate language, the code of which has been optimized, to translate it to a command set for the target computer.

In addition, the present invention further comprises the diagnostic object generating portion 14 that adds a command set for forming the virus diagnosing mechanism 18 to the command sets of the target computer obtained as the final results of the translation from the code generating portion 44. Therefore, the virus diagnosing mechanism 18 to be added by the diagnostic object generating portion 14 is prepared in a state where it is written in the assembler language or the machine language composed of the command sets of the target computer. Another arrangement may, of course, be employed in which a virus diagnosing mechanism expressed in the programming language for use in the source program or in an intermediate language in the compiler is prepared and the virus diagnosing mechanism is embedded into the translating program in the corresponding compiling process. After the virus diagnosing mechanism 18 has been embedded into the object program by the diagnostic object generating portion 14, the object program 16 is, as file information, outputted. Thus, the object program 16 having the virus diagnosing mechanism 18 translated from the source program 10 in the compiler and embedded therein is provided as a program file for a medium, such as a floppy disk or a magnetic tape, or a ROM or a disk unit of the subject computer in an on-line manner.

Figure 4:
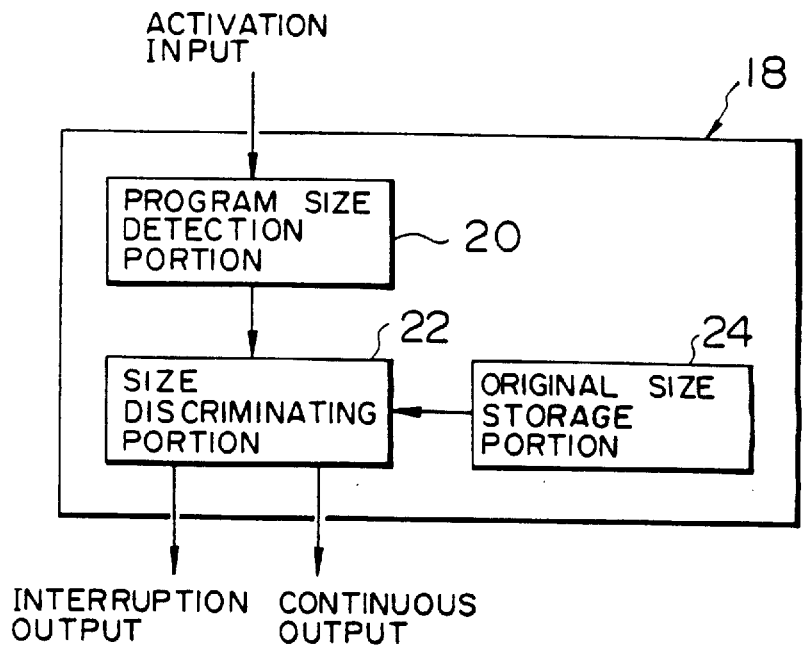
FIG. 4 is a block diagram of a first embodiment of the virus diagnosing mechanism according to the present invention.

FIG. 4 shows a first embodiment of the virus diagnosing mechanism 18 embedded in the source program by the method according to the present invention. The virus diagnosing mechanism 18 is composed of a program size detection portion 20, a size discriminating portion 22 and an original size storage portion 24. The original size storage portion 24 has the program size, for example, the number of bytes, when the object program 16 has been created by the compiling portion 12 shown in FIGS. 2 and 3. The program size, being set therein when the virus diagnosing mechanism 18 has been created by the diagnostic object generating portion 14. In a state where the source program having the virus diagnosing mechanism 18 is executed as an OS or a program on the computer, the program size detection portion 20 receives an activation input when the program proceeds to the process performed by the virus diagnosing mechanism 18 so as to detect the number of bytes of the object program in which the virus diagnosing mechanism 18 is embedded. When the size discriminating portion 22 obtains the size of the execution program from the program size detection portion 20, the size discriminating portion 22 subjects it to a comparison with the original size stored in the original size storage portion 24. If the execution program size coincides with the original size, the program is not broken due to infection of a virus and therefore the size discriminating portion 22 generates a continuous output. Thus, the flow returns to a program process ensuing the process of embedding and discriminating the coincidence of the virus diagnosing mechanism 18 in the object program. If the size of the execution program does not coincide with the original size, it can be understood that the size of the object program has been changed due to an addition of an abnormal process caused from virus infection. In this case, a discrimination is made that virus infection has undergone, and thus an interruption output is generated to prevent the ensuing execution of the object program. When the object program is interrupted, a message that the process has been interrupted due to the virus infection is, of course, outputted to an operator console or the like.

Figure 5:
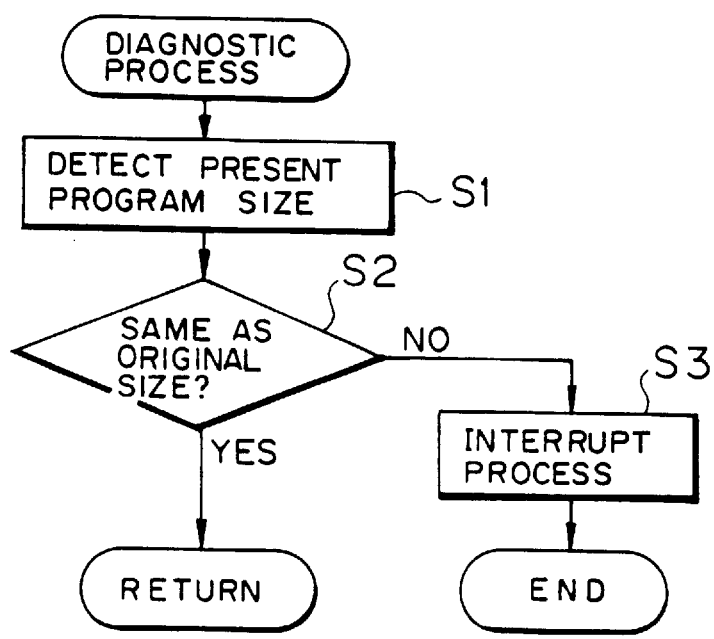
FIG. 5 is a flow chart of the processing operation shown in FIG. 4.

FIG. 5 shows an operation to be performed by the virus diagnosing mechanism 18 shown in FIG. 4. When the flow has been shifted from the process of the object program to the process to be performed by the virus diagnosing mechanism 18, the size of the own object program, which is being executed, is detected in step S1. In step S2, a comparison with the original size stored previously is made to discriminate whether or not they coincide with each other. If they coincide with each other, the flow again returns to the process of the normal object program. If the detected program size is not the same as the original size, a discrimination is made that the program size has been changed due to the virus infection, and the process is interrupted in step S3.

Figure 6:
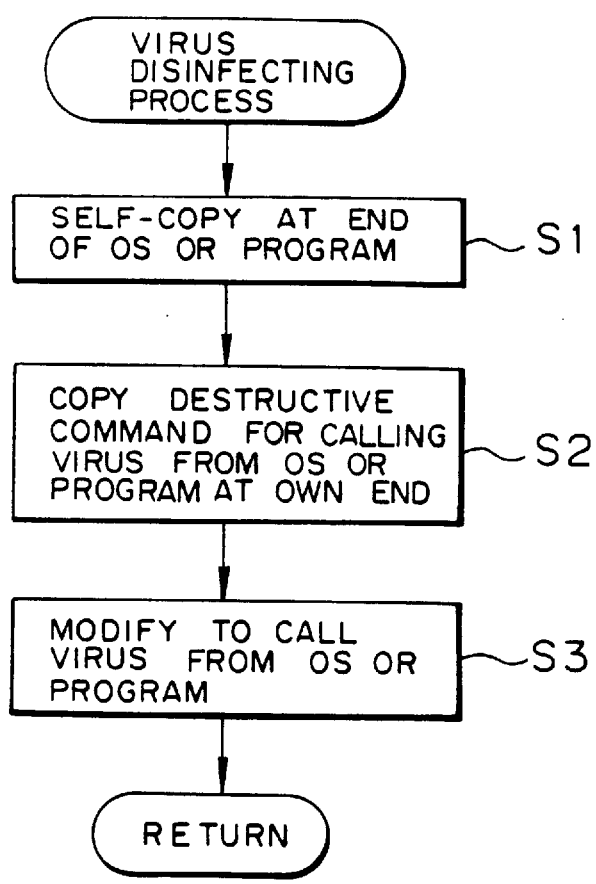
FIG. 6 is a flow chart of a process against virus infection.

FIG. 6 shows an example of a process of disinfecting a computer virus. The virus disinfecting process is performed such that the virus is copied at the end of the OS or the program in step S1. In step S2, a destructive command for calling the virus from the OS or the program is copied at own end. In step S3, a modification is performed to call the virus from the OS or the program.

Figure 7A:
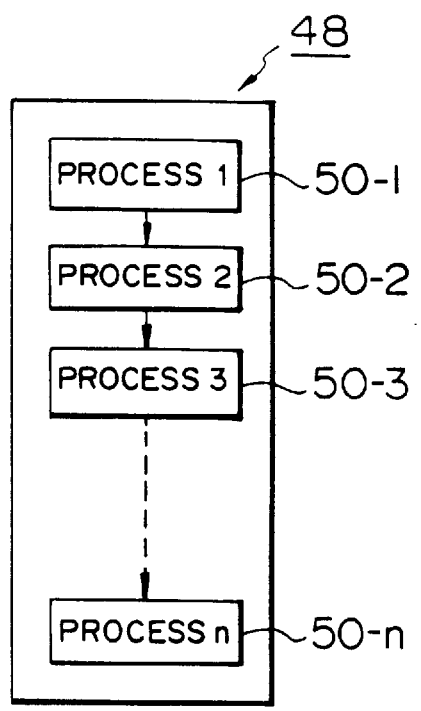
FIGS. 7A and 7B show the structures of the program before and after it has been infected with a virus.

FIG. 7A shows an object program 48 which is not infected. The object program 48 has a structure that processes 1 to n divided into process blocks 50-1 to 50-n are sequentially executed. If the object program 48 having the foregoing structure is infected with the virus shown in FIG. 6, the structure of the program is changed like the infected source program 52 shown in FIG. 7B. That is, the virus process block 54 formed by self-copying the virus ensuing process 1 of the process block 50-1 is added to the original source program 48. Then, process 2 of the process block 52 broken by the virus is added. Then, the flow returns to process 3 of the process block 53 of the original source program 48. The thus constituted program structure results in that an increased region 60 is added to the original source program 48 due to the virus infection.

Figure 8A:
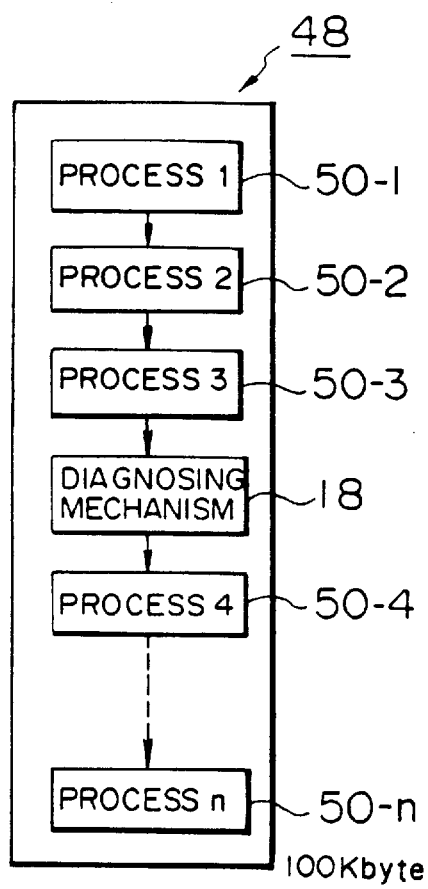
FIGS. 8A and 8B show the structure of the program formed in a case where virus infection has been discriminated.
Figure 8B:
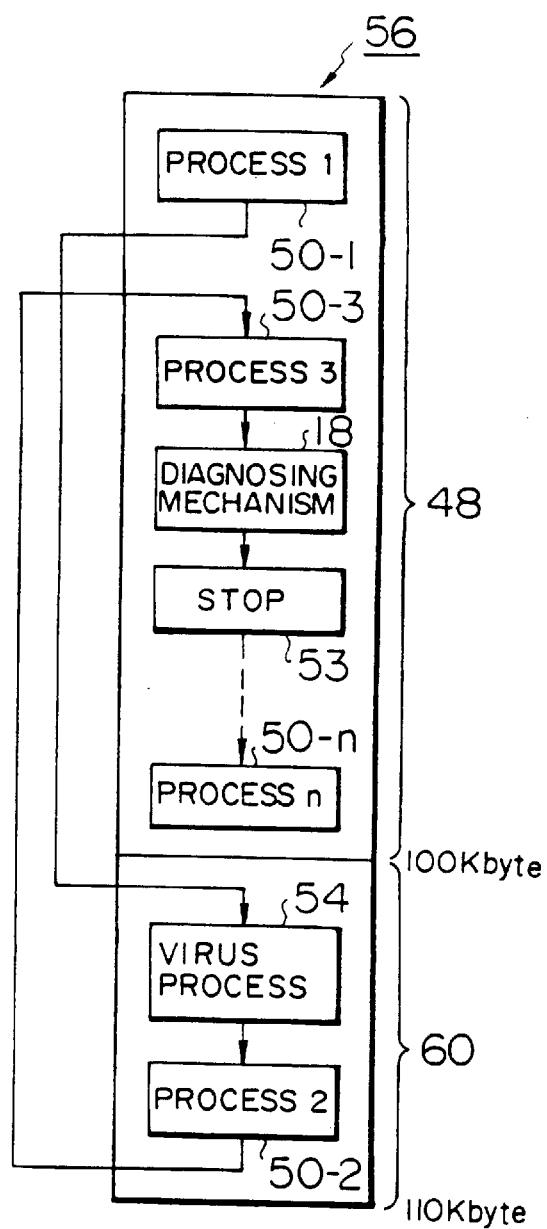

FIG. 8A shows the source program 48 according to the present invention that has not been infected with a virus. The virus diagnosing mechanism 18 generated at the time of the compilation is embedded between process 2 and process 4 indicated by process blocks 50-3 and 50-4. The size of the object program 48 having the aforesaid virus diagnosing mechanism 18 embedded therein is, for example, 100K bytes, the size of the object program 48 being, as the original size, previously set in the original size storage portion 24 shown in FIG. 4. If the object program 48 shown in FIG. 8A is infected with a virus, the object program 48 is formed into an object program 56 as shown in FIG. 8B. The object program has a structure that a virus process block 54 formed by self-copying the virus is added to the end of the original object program 48. Furthermore, process 2 of the process block 50-3 is set as a destructive command for calling the virus. Then, a program structure is constituted in which process 1 of the process block 50-1 of the object program 48 is continued to the process block 54 formed by copying the virus, and then process 2 of the process block 52-2, which is the subject of the destruction, is again continued to process 3 of the process block 50-3 of the object program 48. If the virus infection of the foregoing type takes place in process 2 of the process block 50-2, the program size, which is 100K bytes before the infection, is changed to 110K bytes because the increased region 60 having a size of, for example, 10K bytes is added due to the infection. In order to cope with the change in the program size, this embodiment comprises the virus diagnosing mechanism 18 shown in FIG. 4 to be performed next to process 3 of the process block 50-3 so that the virus diagnosing process is executed in accordance with the flow chart shown in FIG. 5. In this case, the program size has been changed from the original size of 100K bytes to 110K bytes. Therefore, the fact that two program sizes do not coincide with each other causes a discrimination to be made that the virus infection has taken place. Thus, the flow proceeds to block 58, and therefore the process of the object program can be interrupted. Therefore, further spread of the virus infection due to the continuation of the object program can be prevented. By outputting the message of the interruption of the process due to the virus infection on the operator console together with the program name or the program number of the object program at the time of interrupting the process, virus infection of a specific program or OS can be notified.

Figure 9:
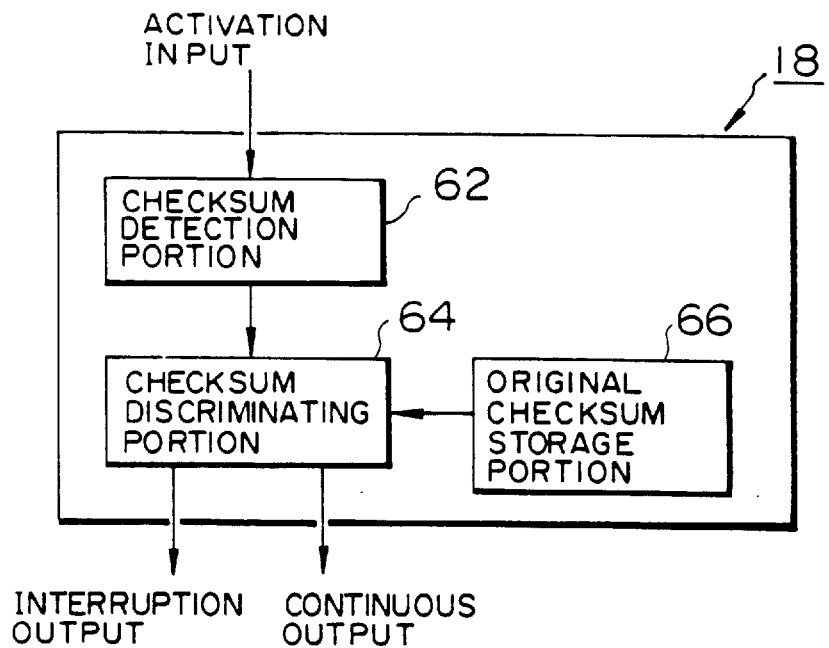
FIG. 9 a block diagram of a second embodiment of the virus diagnosing mechanism according to the present invention.

FIG. 9 shows a second embodiment of the virus diagnosing mechanism 18 according to the present invention. The virus diagnosing mechanism 18 according to the second embodiment comprises a checksum detection portion 62, a checksum discriminating portion 64 and an original checksum storage portion 66. Since the checksum of the source program outputted from the compiler has been obtained for each memory block having a predetermined size in a memory unit, such as a ROM, for storing the source program, the obtained checksum is, as the original checksum, stored in the original checksum storage portion 66. When an activation input has been supplied due to completion of the previous process as a result of the execution of the source program having the virus diagnosing mechanism 18 embedded therein, the checksum detection portion 62 detects the checksum in units of memory blocks. The checksum discriminating portion 64 subjects the detected checksums with the original checksums of the corresponding blocks. If the checksums coincide with one another, a continuous output is generated. If the checksums do not coincide with one another, a discrimination is made that virus infection has taken place. Thus, an interruption output interrupts the process.

Figure 10:
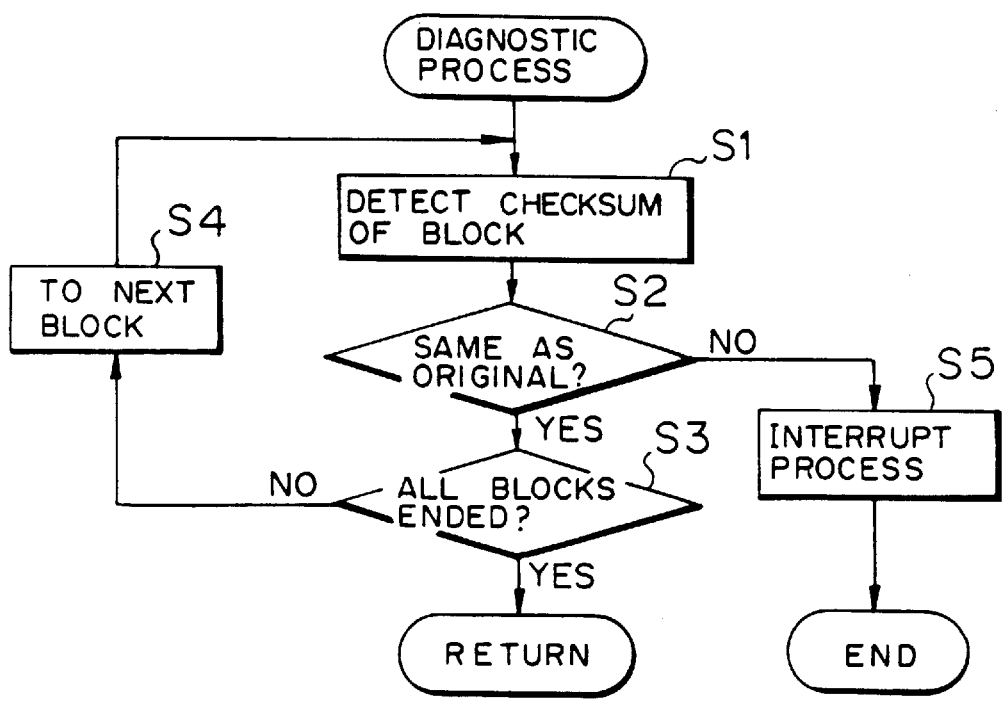
FIG. 10 a flow chart of the processing operation shown in FIG. 9.

FIG. 10 shows an operation of diagnosing a virus by using the checksum shown in FIG. 9. In step S1, the checksum of the leading block of the object program is detected. In step S2, whether the detected checksum is the same as the original checksum or not is checked. If they are the same, the flow proceeds to step S3 and the next block is checked if all blocks have not been completed. Thus, the detection of the checksum in step S1 and the comparison with the original checksum in step S2 are repeated until all blocks are diagnosed. If the checksums of all blocks coincide with the original checksums, the flow returns to the process of the original object program. If a checksum in any block does not coincide with the original checksum, the flow proceeds to step S5 in which a discrimination is made that virus infection has taken place and the process is interrupted.

Figure 11:
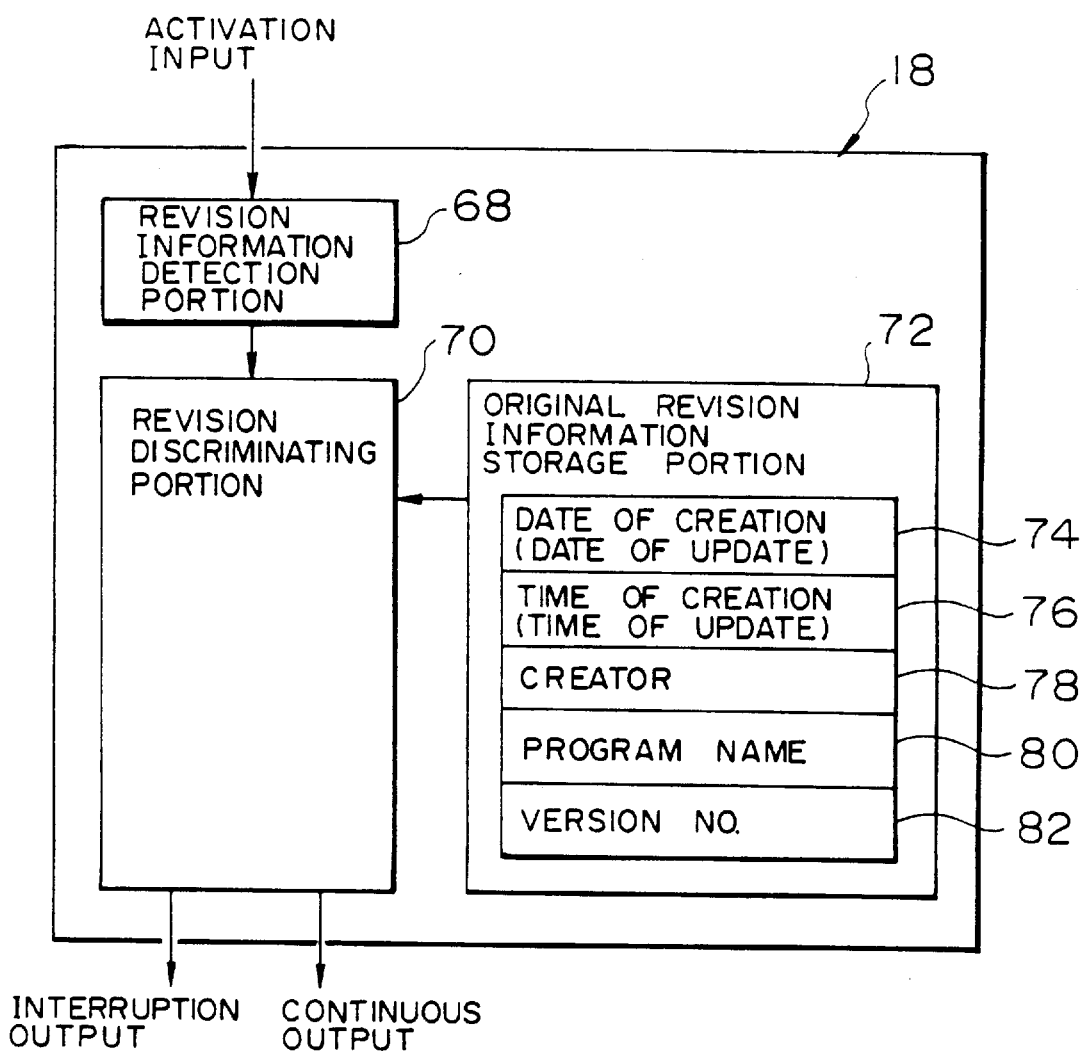
FIG. 11 is a block diagram of a third embodiment of the virus diagnosing mechanism according to the present invention.

FIG. 11 shows a third embodiment of the virus diagnosing mechanism 18 according to the present invention. In this embodiment, revision information of the source program is utilized. The virus diagnosing mechanism according to the third embodiment is composed of a revision information detection portion 68, a revision discriminating portion 70 and an original revision information storage portion 72. In general, an object program has a revision region in the leading area thereof for the purpose of indicating the state of revision, such as a version number indicator. The revision region stores date of creation, time of creation, name of creator, name of the program and version No. Since the object program is treated as a file on a disk medium of a disk unit, the revision region present in the file on the disk medium is included. Therefore, creation date (update data included) 74, creation time (update time included) 76, creator's name 78, program name 80 and version No. 82 are, as original revision information, set in the original revision information storage portion 72 of the virus diagnosing mechanism 18 when the compiling process is performed. When the forward process of the object program having the virus diagnosing mechanism 18 embedded therein has been completed and an activation input has been supplied, present revision information is detected from the revision region of the source program by the revision information detection portion 68 to send the present revision information to the revision discriminating portion 70. The revision discriminating portion 70 subjects the detected revision information and information stored in the original revision information storage portion 72 to a comparison. If they coincide with each other, the revision discriminating portion 70 generates a continuous output. If they do not coincide with each other, a discrimination is made that virus infection has taken place and an interruption output is generated. The comparison of the revision information is performed in the revision discriminating portion 70 such that the creation date (update data included) 74, the creation time (update time included) 76, the creator's name 78, the program name 80 and the version No. 82 are subjected to the comparison. If any one of the factors subjected to the comparison does not coincide with the original information, a discrimination is made that virus infection has taken place and an interruption output is performed. Note that the revision information for use in the virus diagnosis may be any one of the creation date, the creation time, the creator's name, the program name and the version No. Other revision information may be treated similarly.

Figure 12:
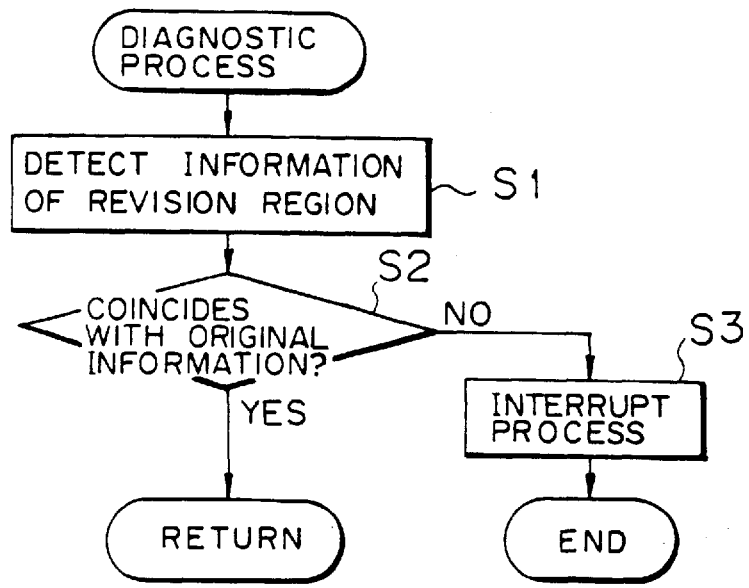
FIG. 12 is a flow chart of the processing operation shown in FIG. 11.

FIG. 12 shows the virus diagnosing operation shown in FIG. 11. In step S1, information of the revision information of the object program is detected. In step S2, whether or not the detected information coincides with original revision information set previously is discriminated. If they coincide with each other, the flow returns to continue the object program. If they do not coincide with each other, a discrimination is made that virus infection has taken place and the process is interrupted in step S3.

Figure 13:
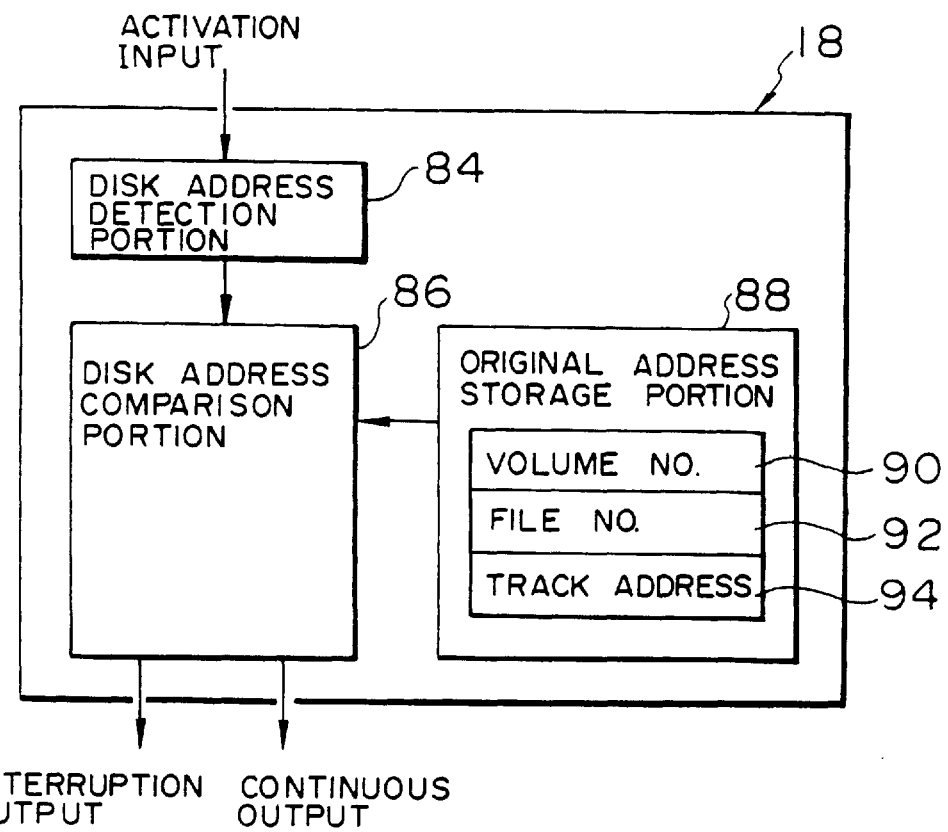
FIG. 13 is a block diagram of a fourth embodiment of the virus diagnosing mechanism according to the present invention.

FIG. 13 shows a fourth embodiment of the virus diagnosing mechanism 18 according to the present invention. This embodiment is characterized in that a disk address is used. The virus diagnosing mechanism 18 according to the third embodiment is composed of a disk address detection portion 84, a disk address comparison portion 86 and an original disk address storage portion 88. An object program created by the compiler is stored in a disk unit that constitutes an input/output sub-system of a target computer system. Therefore, as the disk address indicating the portion of storage, for example, the volume No., the file No. and the track address are written on the object program. When the virus diagnosing mechanism 18 is generated and embedded in the object program by the compiler, volume No. 90, file No. 92, track address 94 and the like indicating the disk address, in which the source program is stored, are stored in the original disk address storage portion 88. In this case, the address may be any one of a start address, an end address or a series of addresses of the object program. When the virus diagnosing mechanism 18 has received an activation input during the execution of the object program having the virus diagnosing mechanism 18 embedded therein, the disk address detection portion 84 detects the disk address that has been written at this time, for example, the volume No., the file No. and the track address to send the disk address to the disk address comparison portion 86. The disk address comparison portion 86 reads, from the original disk address storage portion 88, the volume No. 90, the file No. 92 and the track address 94 as the original information to subject them to a comparison with detected information supplied from the disk address detection portion 84. If the detected information and the original information coincide with each other, the disk address comparison portion 86 discriminates that no virus infection takes place and generates a continuous output for continuing the object program. If the detected information and the original information do not coincide with each other, the disk address comparison portion 86 discriminates that a portion of the disk address has been broken due to virus infection and generates an interruption output.

Figure 14:
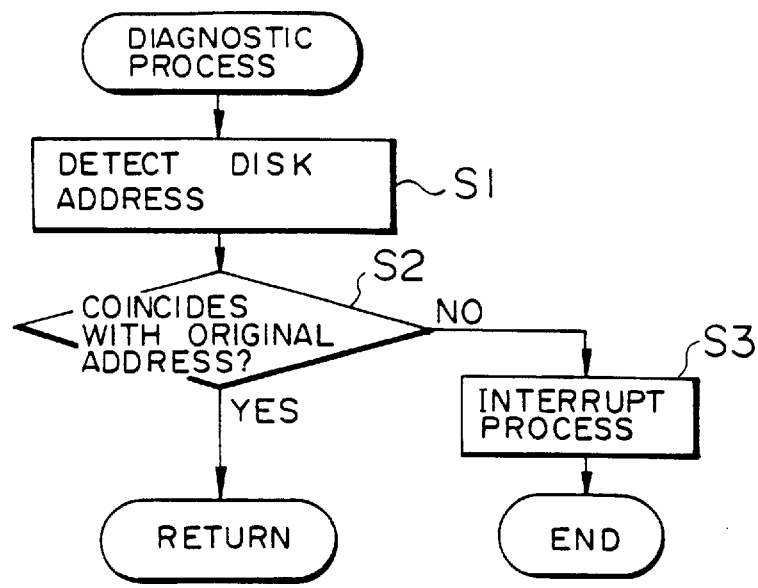
FIG. 14 is a flow chart of the processing operation shown in FIG. 13.

FIG. 14 shows a virus diagnosing operation shown in FIG. 13. In step S1, the disk address is detected, and whether the detected disk address coincides with the original address or not is discriminated. If they coincide with each other, the flow returns to a normal process. If they do not coincide with each other, a discrimination is made that virus infection has taken place and the process is interrupted in step S3.

Figure 15:
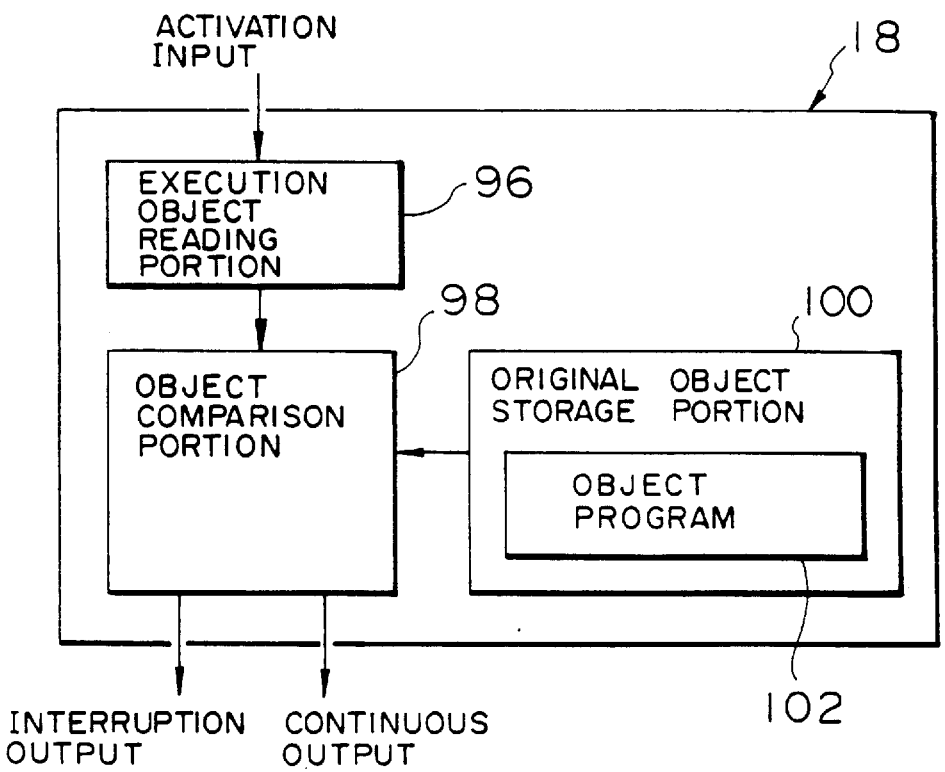
FIG. 15 is a block diagram of a fifth embodiment of the virus diagnosing mechanism according to the present invention.

FIG. 15 shows a fifth embodiment of the virus diagnosing mechanism 18 according to the present invention. The fifth embodiment is characterized in that the overall portion of the object program is subjected to a comparison with an original to discriminate the virus infection. The virus diagnosing mechanism 18 according to the fifth embodiment is composed of an execution object reading portion 96, an object comparison portion 98 and an original object storage portion 100. The original object storage portion 100 stores an object program 102 as it is.

Figure 16:
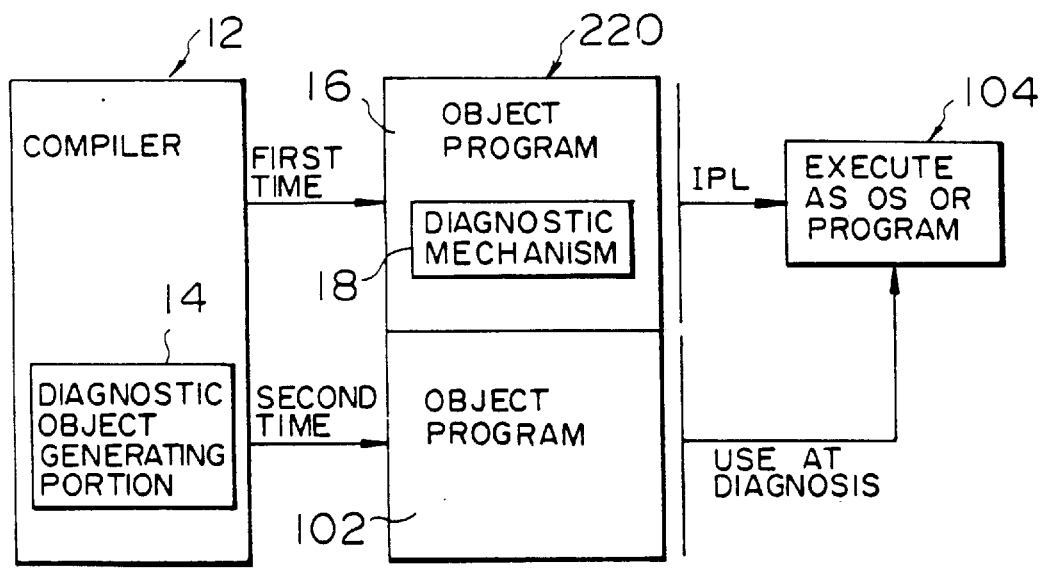
FIG. 16 shows creation of the virus diagnosing mechanism shown in FIG. 15 and its diagnosing process.

FIG. 16 shows the procedure of creating the virus diagnosing mechanism for use in the fifth embodiment shown in FIG. 15. A diagnostic object generating portion 14 disposed in the compiler stores, at the first output to be received by an object file 220, the object program 16 having the virus diagnosing mechanism 18 embedded therein. Then, the function of the diagnostic object generating portion 14 causes an object program 102 that does not contain the virus diagnosing mechanism 18 to be outputted and stored in the object file unit 220. The object program 16 having the virus diagnosing mechanism 18 outputted at the first time and embedded therein is initial-program-loaded (IPL) into a target computer system 104 so as to be executed as an OS or a program. In the execution of the object program 16 having the virus diagnosing mechanism 18 serving as the OS or the program, the virus diagnosing mechanism 18 performs the process shown in FIG. 15. Thus, the function of the original object storage portion 100 causes the object program 102 outputted at the second time and stored in the object file unit 220 to be read as original information to be used in the diagnosis.

Figure 17:
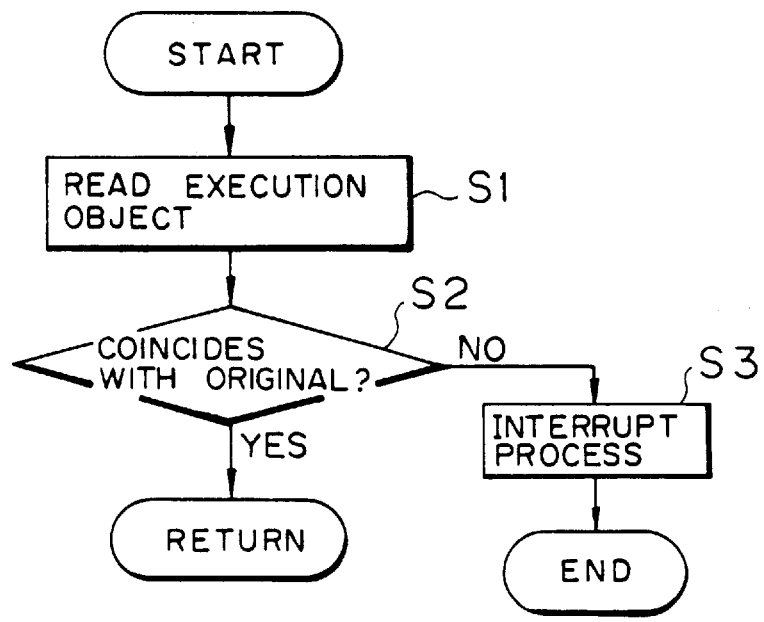
FIG. 17 is a flow chart of the processing operation shown in FIG. 15.

FIG. 17 shows the virus diagnosing operation according to the fifth embodiment shown in FIG. 15. In step S1, the object program which is being executed is read and developed in a working region of the memory. In step S2, the original object program 102 that is stored in the external file unit 220 or the like and that is not used in the computer system 104 is read and developed in the working region so as to be subjected to a comparison, in command units, with the object program which has been read and which is being executed in step S1. Since the parameter in the comparison in the command units varies in each process, it is omitted from the subject of the comparison. If the comparison in the command units results in complete coincidence with the original object program, a discrimination is made that no virus infection takes place and the flow returns to the object program process. If the comparison in the command units results in that the object program does not coincide with the original object program, a discrimination is made that virus infection has taken place and the process is interrupted in step S3. The virus diagnosing mechanism 18 according to the fifth embodiment takes a long time to complete the diagnosis if the object program has a large size as shown in FIG. 16 because the overall portion of the program is subjected to the comparison. Therefore, it is preferable that the virus diagnosing mechanism 18 be activated in an idle time after the idle routine of the computer system 104 has been detected. If the object program has a small size, the activation may, of course, be performed at each execution of the object program.

Figure 18:
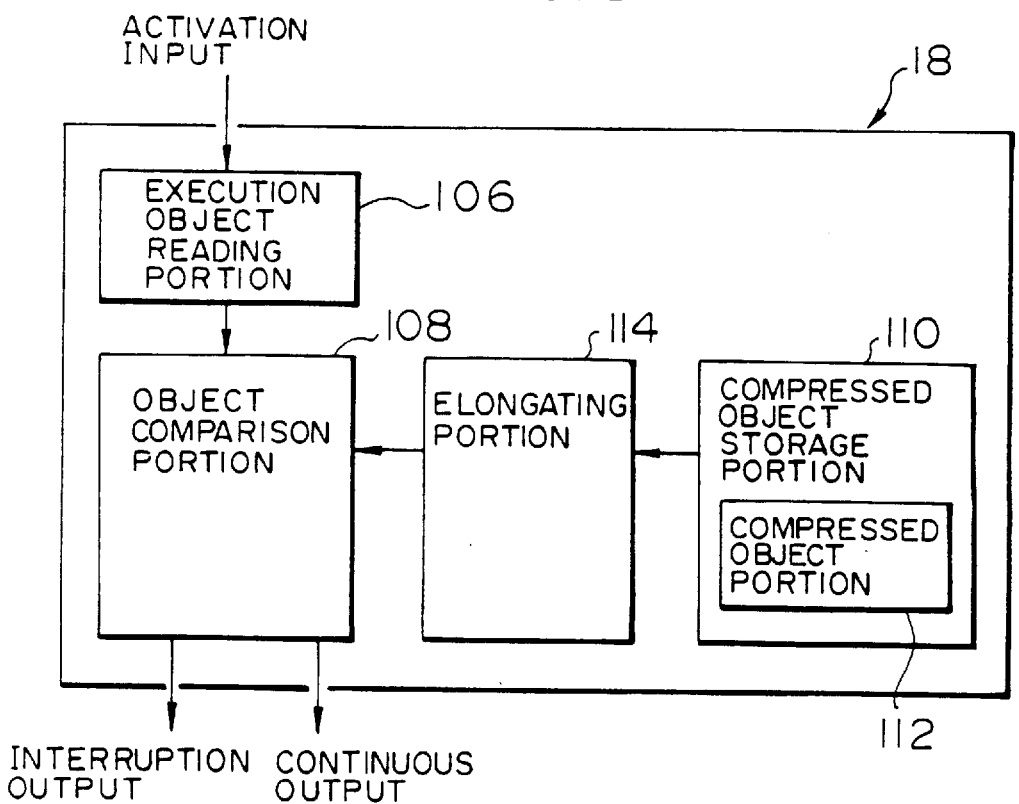
FIG. 18 is a block diagram of a sixth embodiment of the virus diagnosing mechanism according to the present invention.

FIG. 18 shows a sixth embodiment of the virus diagnosing mechanism 18 according to the present invention. The sixth embodiment is characterized in that the overall portion of the object program is subjected to a comparison and discrimination and that the original object program for use in the comparison and discrimination is outputted in a compressed form and it is decompressed at the time of the comparison and discrimination to be restored to the original object program. The virus diagnosing mechanism 18 is composed of an execution object reading portion 106, an object comparison portion 108, a compressed object storage portion 110 and a decompressing portion (a restoring portion) 114. In the compressed object storage portion 110, a compressed object program 112 is stored.

Figure 19:
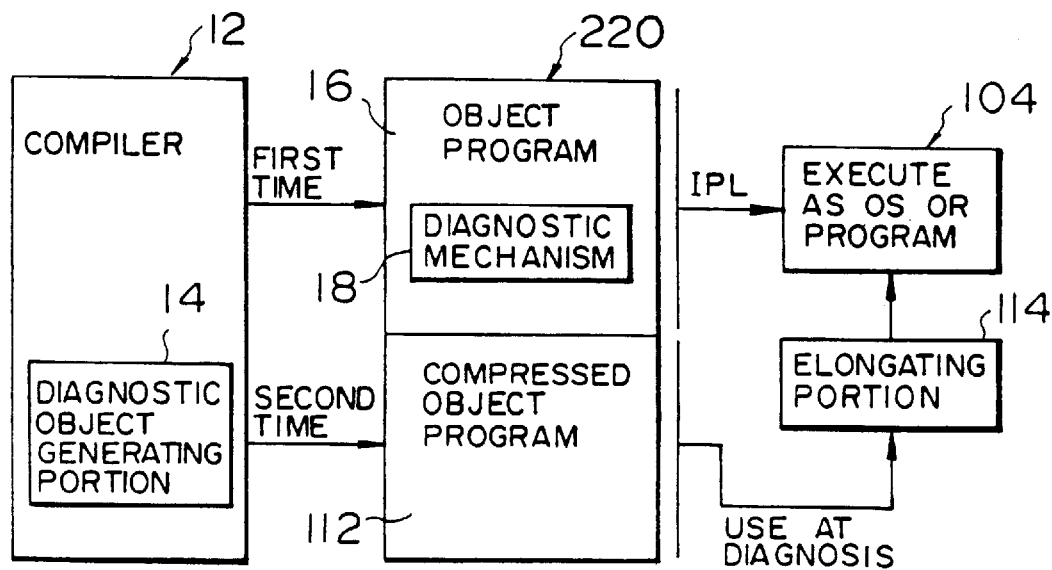
FIG. 19 shows creation of the virus diagnosing mechanism shown in FIG. 18 and its diagnosing process.

FIG. 19 shows a state where the virus diagnosing mechanism 18 according to the sixth embodiment shown in FIG. 18 is generated. The diagnostic object generating portion 14 disposed in the compiler 12 stores the object program 16 having the virus diagnosing mechanism 18 shown in FIG. 19 and embedded therein into the object file unit 220 at the first output. At the second output, the diagnostic object generating portion 14 outputs an object program that has not the virus diagnosing mechanism 18 embedded therein. In this embodiment, a compressing algorithm is included in the diagnostic object generating portion 14 so that the object program is compressed and then it is outputted, the object program being then stored in the object file unit 220 as the compressed object program 112. As the compressing algorithm to be included in the diagnostic object generating portion 14, a binary arithmetic coding algorithm is employed for example so that the size of the object program 16 can be compressed to about 2% of the original size. Therefore, the region required to store the compressed object program 112 can significantly be narrowed.

The object program 16 stored in the object file unit 220 and having the virus diagnosing mechanism 18 embedded therein is initial-program-loaded (IPL) into the target computer system 104 so as to be executed as an OS or a program. In the execution of the object program 16 in the computer system 104, the compressed object program 112 stored in the object file 220 is read when the virus diagnosing mechanism 18 has been activated. The compressed object program 112 is then decompressed in the decompressing portion 114, and then it is subjected, in the object comparison portion 108, to a comparison with the object program which is being executed so that a discrimination is made. It is preferable that the decompressing portion 114 for decompressing the compressed object program 112 is not provided for only the virus diagnosing mechanism 18 but act as a decompressing program of the computer system 104.

Figure 20:
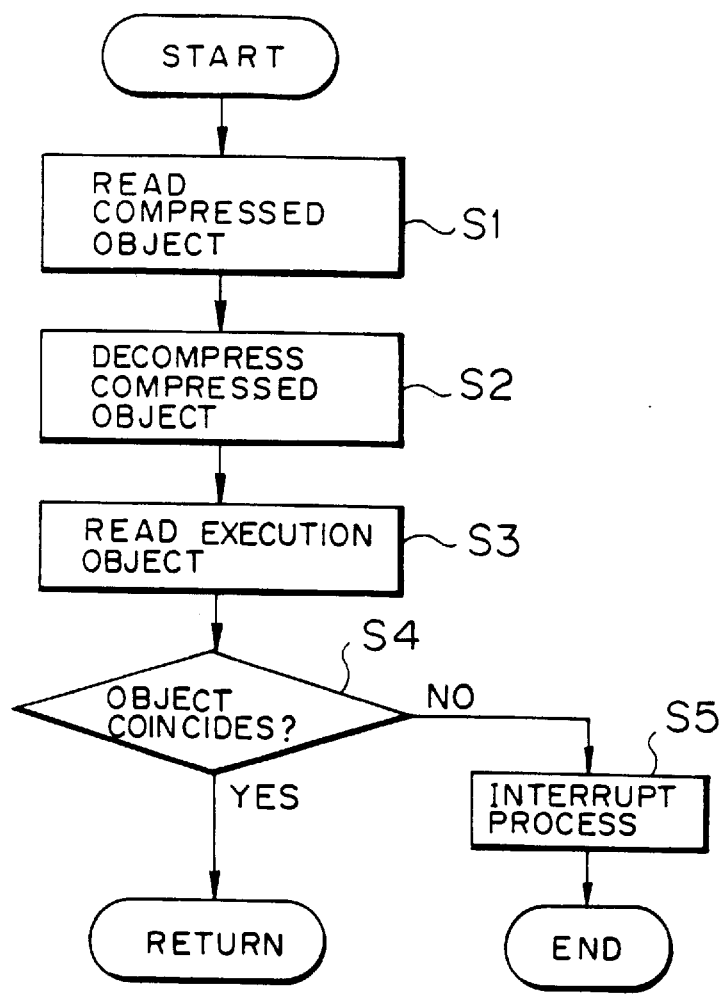
FIG. 20 is a flow chart of the processing operation shown in FIG. 18.

FIG. 20 shows a virus diagnosing operation shown in FIG. 18. In step S1, the compressed object program is read, and the compressed object program is decompressed to be developed into the original object program in step S2. The foregoing operations of reading the compressed object program and decompressing the same into the object program are performed on the working region of a memory of the computer system 104. In step S3, the object program, which is being executed, is read on to the same working region. In step S4, the original object program restored from the compressed form and the object program, which is being executed, are subjected to a comparison in, for example, command units so as to discriminate whether or not they coincide with each other. Also in this case, the variable included in the command is omitted from the discrimination similarly to the fifth embodiment. If the two object programs coincide with each other, a discrimination is made that no virus infection takes place, and the flow returns to the process of the original object program. If the two object programs do not coincide with each other in command units, a discrimination is made that virus infection has taken place and the flow proceeds to step S5 to interrupt the process.

Also in the sixth embodiment, if the program size is large, a long time takes to complete the virus diagnosing process because the overall portion of the object program is subjected to comparison so as to be discriminated. Therefore, it is preferable that the diagnosing process be performed when the computer system 104 is in an idle state. If the program size is small, the virus diagnosing process may, of course, be performed in the object program.

Figure 7B:
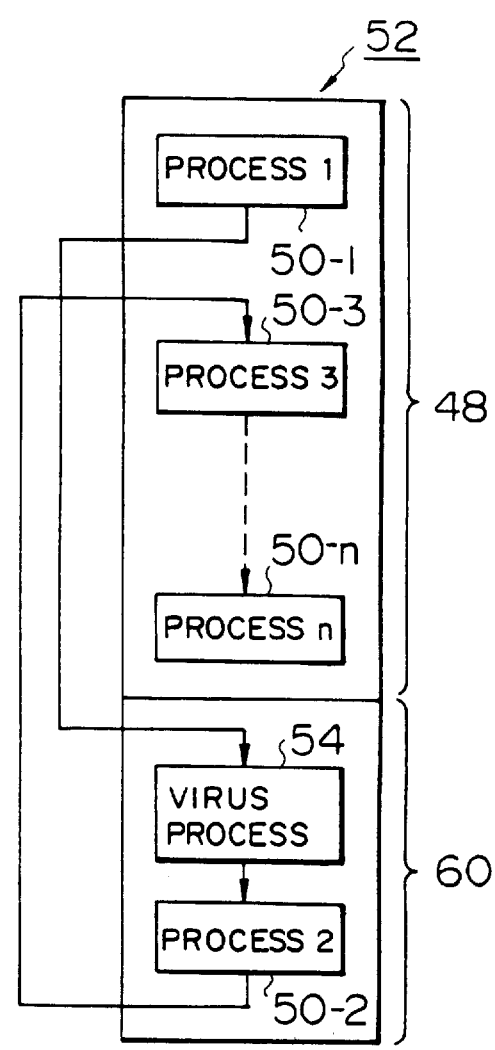

As another embodiment of the present invention, it is preferable that the attribute of inhibiting updating be set to the object program 16 when the object program 16 is outputted in addition to the aforesaid virus diagnosing mechanism 18 according to any one of the first to sixth embodiments. That is, if the object program 16 is infected with a virus, the object program is rewritten as shown in FIGS. 7B and 8B. Therefore, in order to inhibit the rewriting of the object program due to the virus infection, the attribute of inhibiting updating is set when the object program 16 is outputted from the compiler. The foregoing attribute of inhibiting attribute set as described above causes the object program 16 to have a function that can be realized when a vaccine for preventing the virus infection is injected.

As described above, it is preferable that a vaccine of a type setting the attribute of inhibiting updating be used in addition to embedding the virus diagnosing mechanism 18 in the object program for the purpose of preventing damage of the virus infection. However, the vaccine of the type of setting the attribute of inhibiting updating is effective against a specific virus but it is usually ineffective against another virus. Therefore, it is used as a preventive means.

As described above, according to the present invention, virus infection can be discriminated by the virus diagnosing mechanism embedded in the object program and the process is interrupted if the infection has been detected. Therefore, damage of the virus infection can be minimized and an adequate infection preventive countermeasure can be taken. The virus diagnosing mechanism is, in the compiler stage, automatically embedded into the object program by the diagnosing object generating function provided for the compiler. Therefore, the necessity of having a consciousness of the virus diagnosing mechanism in the stage of manufacturing the source program can be eliminated. As a result, the process of manufacturing the source program can be performed freely. Furthermore, the virus diagnosing mechanism is automatically embedded into the object program in each of the process of compiling the source program. Therefore, infection of the OS or the program in the target computer can be detected quickly and damage can assuredly be minimized.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A system for creating a virus diagnosing mechanism comprising:

a compiler that translates a source program into an object program executable by a computer; and a diagnostic object generator that operates in conjunction with said compiler to generate a virus diagnosing portion, at the time of compiling the source program, adapted to detect a virus in said object program, integrated with said object program at the time of compiling.

2. A system according to claim 1, wherein said virus diagnosing portion generated by said diagnostic object generating portion comprises:

an original size storage portion in which an original size of said object program, detected when said object program is translated by said compiler, is stored;

an execution size detection portion for detecting a size of said object program when said object program is loaded as an operating system or a program by said computer; and a size discriminating portion that compares said original size and said execution size when said object program is executed and allows the execution to continue if said two sizes coincide with each other and interrupts the execution if said two sizes do not coincide with each other.

3. A system according to claim 1, wherein said virus diagnosing portion generated by said diagnostic object generating portion comprises:

an original checksum storage portion in which an original checksum of said object program, detected when said object program is translated by said compiler, is stored;

a checksum detection portion for detecting a checksum of said object program when said object program is loaded as an operating system or a program by said computer; and a checksum discriminating portion that compares said original checksum and said checksum when said object program is executed and allows the execution to continue if said two checksums coincide with each other and interrupts the execution if said two checksums do not coincide with each other.

4. A system according to claim 1, wherein said virus diagnosing portion generated by said diagnostic object generating portion comprises:

an original revision storage portion in which original revision information of said object program, detected when said object program is translated by said compiler, is stored;

a revision detection portion for detecting revision information of said object program when said object program is loaded as an operating system or a program for said computer; and a revision discriminating portion that compares said original revision information and said revision information and allows the execution to continue if said two revision information items coincide with each other and interrupts the execution if said two revision information items do not coincide with each other.

5. A system according to claim 4, wherein said original revision information comprises at least one of a date of creation including updating, a time of creation including updating, a name of creator, a name of program and a version number.

6. A system according to claim 1, wherein said virus diagnosing portion generated by said diagnostic object generating portion comprises:

a disk address storage portion in which an original disk address indicating the place, in which said object program translated by said compiler is stored, is stored;

a disk address detection portion for detecting a disk address of said object program when said object program is loaded as an operating system or a program by said computer; and a disk address comparison portion that compares said original disk address and said disk address when said object program is executed and allows the execution to continue if said two disk addresses coincide with each other and interrupts the execution if said two disk addresses do not coincide with each other.

7. A system according to claim 1, wherein said virus diagnosing portion generated by said diagnostic object generating portion comprises:

an original object storage portion in which a copy of said object program as translated by said compiler is stored;

an execution object reading portion for reading said copy of said object program when said object program is loaded as an operating system or a program by said computer; and an object comparison portion that compares said object program and said copy of said object program when said object program is executed and allows the execution to continue if said two objects coincide with each other and interrupts the execution if said two objects do not coincide with each other.

8. A system according to claim 1, wherein said virus diagnosing portion generated by said diagnostic object generating portion comprises:

a compressed object storage portion in which a compressed copy of said object program is stored;

an execution object reading portion for reading said compressed copy of said object program when said object program is loaded as an operating system or a program by said computer;

a restoring portion for decompressing said compressed object program; and an object comparison portion that compares said decompressed object program and said object program when said object program is executed and allows the execution to continue if said two objects coincide with each other and interrupts the execution if said two objects do not coincide with each other.

9. A system according to any one of claim 2, wherein said virus diagnosing portion generated by said diagnostic object generating portion further comprises an updating inhibition portion for inhibiting rewriting of said program due to execution of said object program.

10. A method of creating a virus diagnosing mechanism comprising:

translating a source program into an object program that can be executed by a computer; and concurrently with compiling, generating a virus diagnosing portion, at the time of compiling the source program adapted to detect a virus, in said object program integrated with said object program.

11. A method according to claim 10, wherein said virus diagnosing portion comprises:

an original size storage process which an original size of said object program, detected when said object program is stored;

an execution size detection process for detecting size of said object program when said object program is loaded as an operating system or a program by said computer; and a size discriminating process in which said original size and said execution size are compared when said object program is executed and allows the process to continue if said two sizes coincide with each other nd interrupts the process execution if said two sizes do not coincide with each other.

12. A method according to claim 10, wherein said virus diagnosing portion comprises:

an original checksum storage process in which an original checksum of said object program, detected when said object program is compiled;

a checksum detection process for detecting a checksum of said object program when said object program is loaded as an operating system or a program by said computer; and a checksum discriminating process in which said original checksum and said checksum are compared when said object program is executed and allows the process execution to continue if said two checksums coincide with each other and interrupts the process execution if said two checksums do not coincide with each other.

13. A method according to claim 10, wherein said virus diagnosing portion comprises:
- an original revision storage portion in which original revision information of said object program, detected when said object program is stored;
- a revision detection process for detecting revision information of said object program when said object program is loaded as an operating system or a program by said computer; and
- a revision discriminating process in which said original revision information and said revision information is compared and allows the process execution to continue if said two revision information items coincide with each other and interrupts the process execution if said two revision information items do not coincide with each other.

14. A system according to claim 13, wherein at least said original revision information comprises at least one of a date of creation including updating, a time of creation including updating, a name of creator, a name of program and a version number.

15. A method according to claim 10, wherein said virus diagnosing portion comprises:
- a disk address storage process in which an original disk address indicating the place, in which said object program is stored;
- a disk address detection process for detecting a disk address of said object program when said object program is loaded as an operating system or a program by said computer; and
- a disk address comparison process in which said original disk address and said disk address are compared when said object program is executed and allows the process execution to continue if said two disk addresses coincide with each other and interrupts the process execution if said two disk addresses do not coincide with each other.

16. A method according to claim 10, wherein said virus diagnosing portion comprises:
- an original object storage process in which a copy of said object program is stored;
- an execution object reading process for reading said copy of said object program when said object program is loaded as an operating system or a program by said computer; and
- an object comparison process which compares said object program and said copy of said object program when said object program is executed and allows the execution to continue if said two objects coincide with each other and interrupts the process execution if said two objects do not coincide with each other.

17. A system according to claim 10, wherein said virus diagnosing portion comprises:
- a compressed object storage process in which a compressed copy of said object program is stored;
- an execution object reading process for reading said compressed copy of said object program when said object program is loaded as an operating system or a program by said computer;
- a restoring process for decompressing said compressed object program; and
- an object comparison process which compares said decompressed object program and said object program when said object program is executed and allows the execution to continue if said two objects coincide with each other and interrupts the process execution if said two objects do not coincide with each other.

18. A method according to any one of claim 11, wherein said virus diagnosing portion generated in said diagnostic object generating process further comprises an updating inhibition process for inhibiting rewriting of said program due to execution of said object program.

19. An object program, produced by a compiler, that can be loaded in a computer and executed as an operating system or a program, comprising:
- a reference information detection portion for generating reference information when said object program is compiled from source code, said reference information used to diagnose a virus in said object program;
- an execution information detection portion for detecting execution information which is used for virus diagnosis when said object program is loaded as an operating system or a program by said computer; and
- a discriminating portion that compares said reference information and said execution information when said object program is executed and allows the execution of said object program to continue if both of said information items coincide with each other and interrupts the execution if both of said information items differ.

20. An apparatus according to claim 19, wherein said reference information original size storage portion in which an original size of said object program
and said execution information comprises a size of said object program when said object program is loaded as an operating system or a program for said computer.

21. An apparatus according to claim 19, wherein said reference information comprises an original checksum of said object program and said execution information comprises a
checksum of said object program when said object program is loaded as an operating system or a program for said computer.

22. An apparatus according to claim 19, wherein said reference information comprises original revision information of said object program
and said execution information comprises revision information of said object program when said object program is loaded as an operating system or a program for said computer.

23. An apparatus according to claim 22, wherein said revision information comprises at least one of a date of creation including updating, a time of creation including updating, a name of creator, a name of program and a version number.

24. An apparatus according to claim 19, wherein said reference information comprises a disk address indicating the place in which said object program translated by said compiler is stored and said execution information comprises a
disk address of said object program when said object program is loaded as an operating system or a program for said computer.

25. An apparatus according to claim 19, wherein said reference information comprises a copy of said object program
and said execution information comprises said object program when said object program is loaded as an operating system or a program for said computer.

26. An apparatus according to claim 19, wherein said reference information comprises a restored copy of a compressed copy of said object program;

execution object reading portion for reading and said execution information comprises said object program when said object program is loaded as an operating system or a program for said computer.

27. An apparatus according to any one of claim 20, wherein said virus diagnosing portion further comprises an updating inhibition portion for inhibiting rewriting of said program due to execution of said object program.

28. A virus diagnosing method for diagnosing an object program executed by a computer as an operating system or a program, comprising:

a reference information detection process for generating reference information when said object program is compiled from source code;

an execution information detecting process for detecting execution information which is used for virus diagnosis when said object program is loaded as an operating system or a program by said computer; and a discriminating process which compares said reference information and said execution information when said object program is executed and allows the execution of said object program to continue if both of said information items coincide with each other and interrupts the execution if both of said information items differ.

29. A method according to claim 28, wherein said reference information comprises an original size of said object program and said execution information comprises a size of said object program when said object program is loaded as an operating system or a program by said computer.

30. A method according to claim 28, wherein said reference information comprises an original checksum of said object program and said execution information comprises a checksum of said object program when said object program is loaded as an operating system or a program by said computer.

31. A method according to claim 28, wherein said reference information comprises an original revision information of said object program and said execution information comprises revision information of said object program when said object program is loaded as an operating system or a program by said computer.

32. A method according to claim 31, wherein said revision information comprises at least one of a date of creation including updating, a time of creation including updating, a name of creator, a name of program and a version number.

33. A method according to claim 28, wherein said reference information comprises a disk address indicating the place, in which said object program is stored and said execution information comprises a disk address of said object program when said object program is loaded as an operating system or a program by said computer.

34. A method according to claim 28, wherein said reference information comprises a copy of said object program and said execution information comprises said object program when said object program is loaded as an operating system or a program by said computer.

35. A method according to claim 28, wherein said reference information comprises a decompressed copy of a compressed copy of said object program and said execution information comprises said object program when said object program is loaded as an operating system or a program by said computer.

36. A method according to any one of claims 28, wherein said virus diagnosing process further comprises an updating inhibition process for inhibiting rewriting of said program due to execution of said object program.

37. A program, stored on a computer readable medium for execution on a general purpose computer, comprising:

an object section which performs a main function of the program to provide a service to a user;

a virus diagnosing section, created at the time the program was compiled and integrated with said object program, which, when said program is called, checks said object section, prior to execution, for viruses.

* * * * *

UNITED STATES PATENT AND TRADEMARK OFFICE
CERTIFICATE OF CORRECTION

PATENT NO.  :   5,881,151
DATED       :   March 9, 1999
INVENTOR(S) :   Yamamoto It is certified that error appears in the above-identified patent and that said Letters Patent is hereby corrected as shown below:

Col. 1, line 20, after "virus" insert --,--;
       line 55, after "functions:" should read
       -- I.   Verification of the program size,
          II.  Verification of the checksum,
          III. Verification of revision information, such as date of creation,
          IV.  Verification of the disk address,
          V.   Verification of the object program, and
          VI.  Verification of the object program by using compression and decompression. --

Col. 6, line 13, after "size" delete ",".

Signed and Sealed this

Twenty-eighth Day of March, 2000

Attest:

Q. TODD DICKINSON

*Attesting Officer*        *Commissioner of Patents and Trademarks*